US008869635B2

(12) United States Patent
Daniel et al.

(10) Patent No.: US 8,869,635 B2
(45) Date of Patent: Oct. 28, 2014

(54) EASY-LINK DEVICE FOR FLUID TRANSFER

(75) Inventors: MacDonald Daniel, Bromont (CA); Steven Raymond, St-Henri-de-Levis (CA); David L. Reynolds, Bromont (CA)

(73) Assignee: Duoject Medical Systems Inc., Bromont, Quebec (CA)

( * ) Notice: Subject to any disclaimer, the term of this patent is extended or adjusted under 35 U.S.C. 154(b) by 436 days.

(21) Appl. No.: 13/261,191

(22) PCT Filed: Sep. 8, 2010

(86) PCT No.: PCT/CA2010/001399
§ 371 (c)(1),
(2), (4) Date: Feb. 24, 2012

(87) PCT Pub. No.: WO2011/029184
PCT Pub. Date: Mar. 17, 2011

(65) Prior Publication Data

US 2012/0152039 A1 Jun. 21, 2012

(30) Foreign Application Priority Data

Sep. 8, 2009 (CA) ..................................... 2678198

(51) Int. Cl.
*G01N 1/14* (2006.01)
*B01F 13/00* (2006.01)
*B01F 15/02* (2006.01)
*A61J 1/20* (2006.01)

(52) U.S. Cl.
CPC ........... *A61J 1/2096* (2013.01); *B01F 13/0022* (2013.01); *A61J 2001/2051* (2013.01); *B01F 15/0223* (2013.01); *B01F 13/002* (2013.01); *B01F 15/0212* (2013.01); *A61J 2001/201* (2013.01)
USPC ...................................................... 73/864.74

(58) Field of Classification Search
USPC ...................................................... 73/864.74
See application file for complete search history.

(56) References Cited

U.S. PATENT DOCUMENTS

| | | | | | |
|---|---|---|---|---|---|
| 4,576,211 | A * | 3/1986 | Valentini et al. | .............. | 141/329 |
| 4,939,940 | A * | 7/1990 | Tsukida | ..................... | 73/864.74 |
| 6,752,030 | B2 * | 6/2004 | Egas et al. | ................. | 73/864.74 |
| 6,957,745 | B2 * | 10/2005 | Thibault et al. | ............... | 215/249 |
| 2001/0025672 | A1 * | 10/2001 | Thibault et al. | ............... | 141/329 |

* cited by examiner

*Primary Examiner* — Robert R Raevis
(74) *Attorney, Agent, or Firm* — Eric Fincham

(57) ABSTRACT

A transfer device (10) which comprises an outer housing (24), an inner body (26) formed within the housing (24), the inner body (26) having a conduit (66) extending therethrough to provide fluid communication between upper and lower chambers, the conduit (66) having a piercing tip (68) at a lower end, a cap (54)having a top wall and a downwardly extending wall (58), the cap being retained in position such that access cannot be had to the inner body (26), and a pushing member (44) which has at least one leg (48) extending upwardly, the pushing member having an activated position where the leg (48) will extend upwardly to the upper chamber and move the cap (54) such that access may be had to the inner body (26).

12 Claims, 7 Drawing Sheets

EASY-LINK DEVICE FOR FLUID TRANSFER

FIELD OF THE INVENTION

The present invention relates to a transfer system and more particularly, relates to an assembly for transferring one or more components of a pharmaceutical composition between containers.

BACKGROUND OF THE INVENTION

Typically, a syringe is filled manually by aspirating a liquid pharmaceutical component from a pharmaceutical vial having a neck with a penetrable closure into the syringe through a needle that penetrates the penetrable closure. The method of manually filling the syringe typically includes the steps of drawing air into the body of the syringe, aligning the needle with the vial's penetrable closure and inserting the needle through the penetrable closure into the vial. Subsequently, the vial is inverted and air is forced from the body of the syringe into the vial. The plunger is then withdrawn to draw out the desired volume of the pharmaceutical component into the syringe and the needle is removed from the vial.

Many pharmaceutical preparations must be distributed and sold as two or more separate components—typically a solid component and a liquid component. They are mixed just prior to administration. In some instances, the two or more components may each be a liquid and require mixing just prior to administration to the patient.

SUMMARY OF THE INVENTION

It is an object of the present invention to provide an assembly for mixing the contents of a vial and syringe in a manner so as to leave the mixed composition in the syringe ready for injection.

According to one aspect of the present invention, there is provided a transfer device comprising an outer housing, a wall extending across an interior of the outer housing to thereby form an upper chamber and a lower chamber, the wall having at least one opening therein, an inner body formed in the upper chamber, a conduit extending through the inner body to provide fluid communication between the upper and lower chambers, the conduit having a piercing tip at a lower end thereof, a cap, the cap having a top wall and a downwardly extending side wall, the top wall extending across the upper chamber, the side wall extending downwardly between the outer housing and the inner body; and a pushing member having a bottom wall and at least one leg extending upwardly therefrom, the pushing member having an unactivated position wherein the pushing member is located in the lower chamber, and an activated position wherein the at least one leg extends through the at least one opening in the wall extending across the interior of the outer housing, the arrangement being such that when a vial is inserted in the lower chamber, said pushing member is moved from an unactivated position to an activated position such that the at least one leg will push on the side wall of the cap to raise the top wall of the cap above the outer housing.

According to a further aspect of the present invention, there is provided a method for mixing and using two pharmaceutical constituents, one being in a vial, a second being in a syringe, comprising the steps of providing the transfer device described above, inserting the vial into the lower chamber to thereby pierce a septum of the vial and thereby to equalize pressure within and outside the vial, the vial acting on the pushing member to lift the cap, removing the cap, attaching the syringe to the inner body, advancing a plunger of the syringe to transfer fluid from the syringe to the vial, mixing the two pharmaceutical constituents within the vial, and pulling back the plunger to aspirate the mixture in the vial to the syringe.

The present invention, in the preferred embodiment, provides the easy linking of a vial and a syringe whereby the components may be mixed to form a composition in the syringe ready for patient injection.

The contents of the vial may be any pharmaceutical component, although it will traditionally be a dry pharmaceutical component such as a lyophilized product. However, it will be understood that it could also be a liquid component.

The syringe will normally contain a liquid component which is frequently a diluent for the active pharmaceutical ingredient in the vial. The syringe will be a conventional syringe readily available from many manufacturers. Typically, the syringe will contain a piston and have a back stop or finger flange attached to one end thereof. A plunger rod will be attachable to the piston of the syringe.

The transfer device, as will be readily understood, may be formed of any suitable material and preferably is formed of a molded plastic. The device permits the mixing of a dry pharmaceutical with a liquid such as a diluent.

One problem with transfer devices known in the prior art is that the step of adding air to cancel any vacuum present in the vial is often forgotten. Often a user will attach a transfer device to the syringe first and then attach it to the vial. This causes the diluent to be drawn into the vial by the vacuum and makes it difficult to withdraw the ad mixture. To be sure that the vacuum is always cancelled prior to attachment, the device of the present invention has a luer connection which is hidden and cannot be accessed until the cap is removed. However, the cap is only accessible when the device is coupled to the vial.

As will be understood, both a needle or plastic spike may be utilized. When one has laminated stoppers and relatively thick septums, a needle is preferred as it will more easily penetrate the stopper. However, access to the needle point needs to be denied to prevent needle sticks. The device of the present invention achieves this by preventing access to the needle until the latches are spread by the vial.

BRIEF DESCRIPTION OF THE DRAWINGS

Having thus generally described the invention, reference will be made to the accompanying drawings illustrating an embodiment thereof in which.

DETAILED DESCRIPTION OF THE INVENTION

Figure 1:
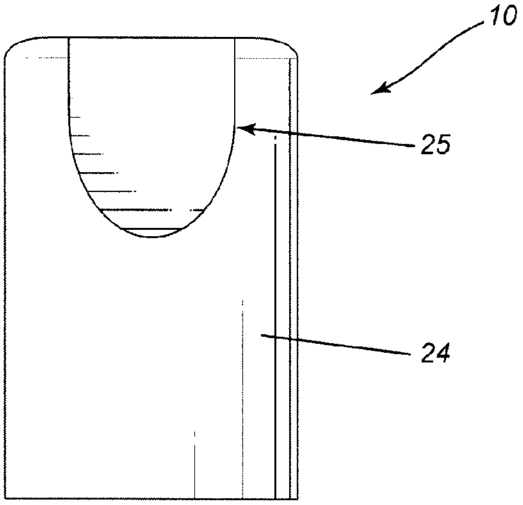
FIG. 1 is a side elevational view of a transfer device according to the present invention.
Figure 2:
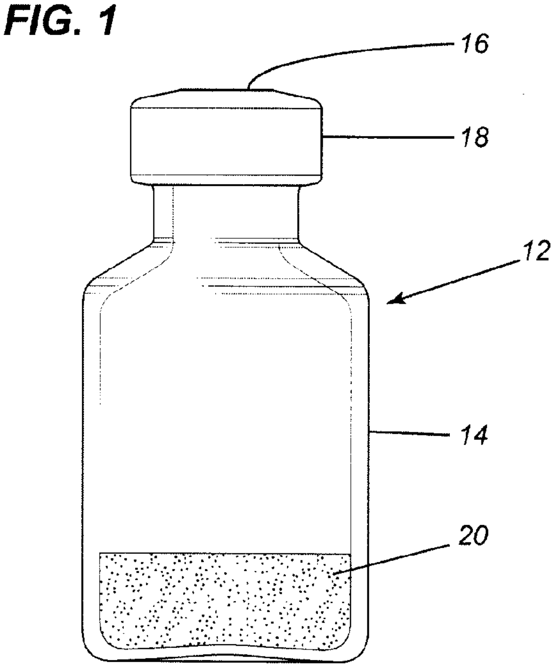
FIG. 2 is a side elevational view, partially in section, of a vial containing a medicant.

Referring to the drawings in greater detail and by reference characters thereto, there is illustrated a transfer system which is generally designated by reference numeral 10 and which is suitable for use with a vial generally designated by reference numeral 12.

Vial 12 has a body 14 with a neck sealed by a septum 16 over which there is a cap 18. A medicant 20 is provided in body 14 and would typically comprise a dry ingredient although a fluid may also be utilized.

Transfer system 10 includes an outer housing 24 having finger grip depressions 25 on opposed sides. An inner body 26 is connected to outer housing 24 by means of a lower horizontal wall 30 which extends between housing 24 and inner body 26. Lower horizontal wall 30 is not continuous, but rather is arranged so that there are a pair of opposed openings or channels 29 which extend through lower horizontal wall 30. Inner body 26 is also provided with a luer connector 28 at an upper portion thereof.

Extending downwardly from lower horizontal wall 30 are a pair of legs 32 each of which has a lower tapered end 34. A latch 36 is also provided on legs 32 for reasons which will become apparent hereinbelow. Formed on an inner face of each latch 36 is a recess 37.

Transfer system 10 also includes a plurality of ribs 38 on the inner side of housing 24 which define channels 29.

A pusher element 44 has a base 46 and a pair of upwardly extending legs 48. A lower portion of upwardly extending legs 48 has an inwardly extending element 50 which preferably terminates in a cruciform configuration 51.

Transfer system 10 also includes a cover 54 which has a top wall 56 and a pair of downwardly extending side wall 58. A pair of slots 60 separate side walls 58 to provide a desired flexibility. On the outside of each side wall 58 there is provided a rib 62. Top wall 56 of cover 54 includes a slight overhang 64.

Transfer system 10 further includes a needle 66 having a piercing tip 68 retained in inner body 26. Needle 66 may be replaced by a spike.

Figure 5A:
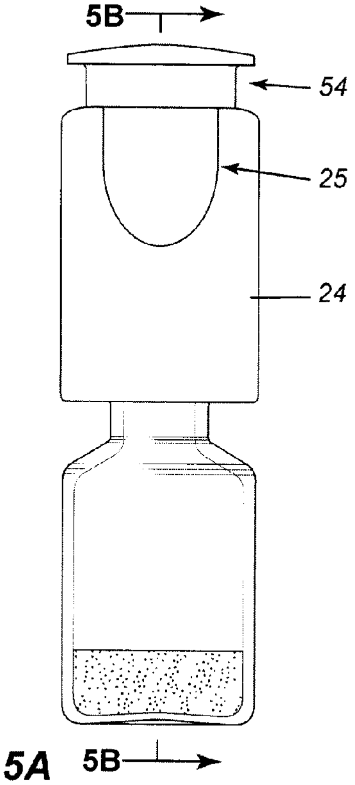
FIG. 5A is a side elevational view of the device being placed on a vial.
Figure 6A:
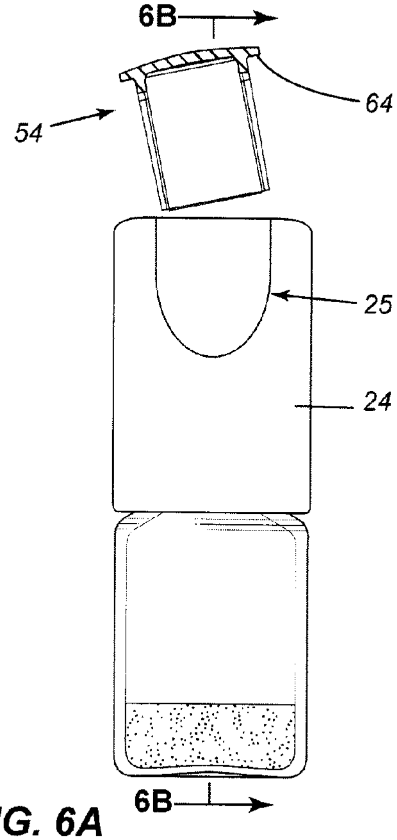
FIG. 6A is a side elevational view showing displacement of the cap.
Figure 5B:
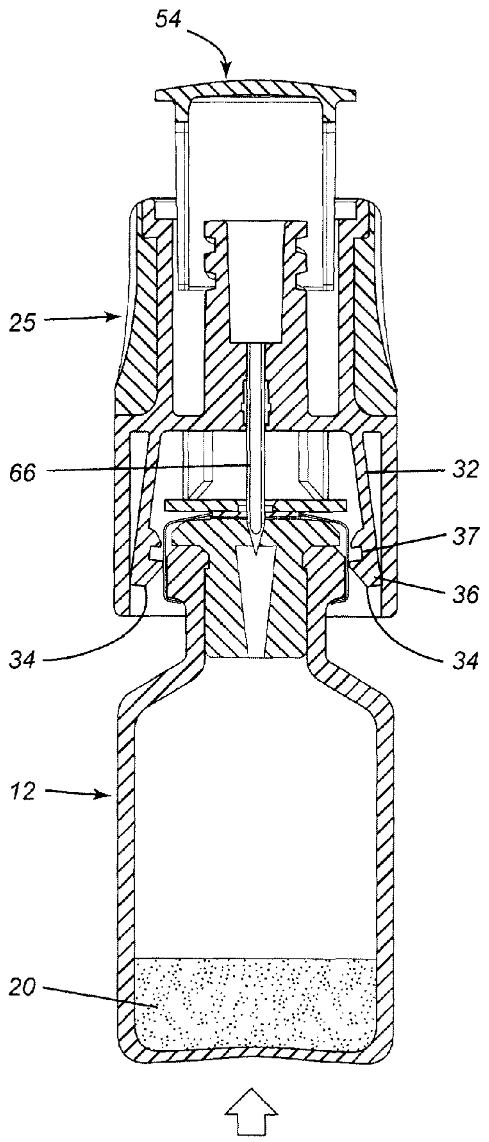
FIG. 5B is a side elevational view thereof.
Figure 6B:
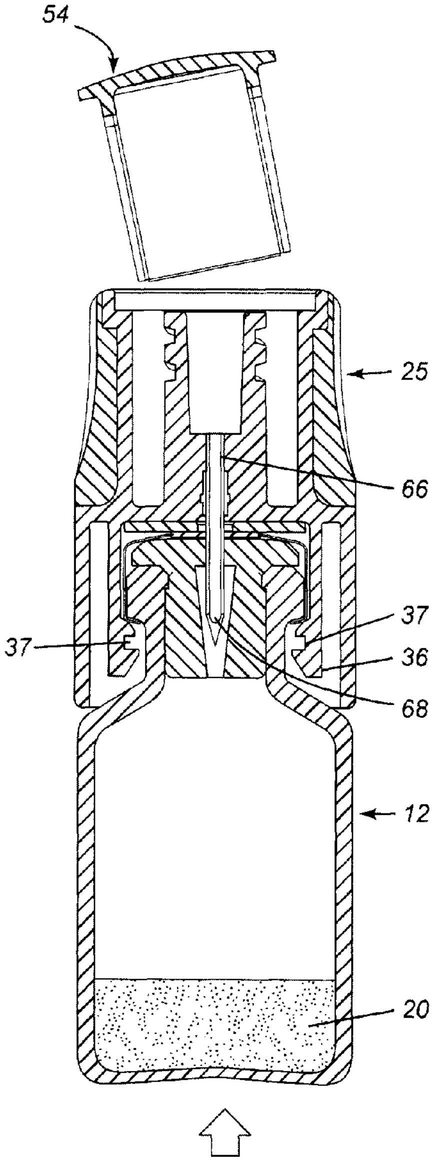
FIG. 6B is a cross sectional view illustrating the cap being ejected.
Figure 13:
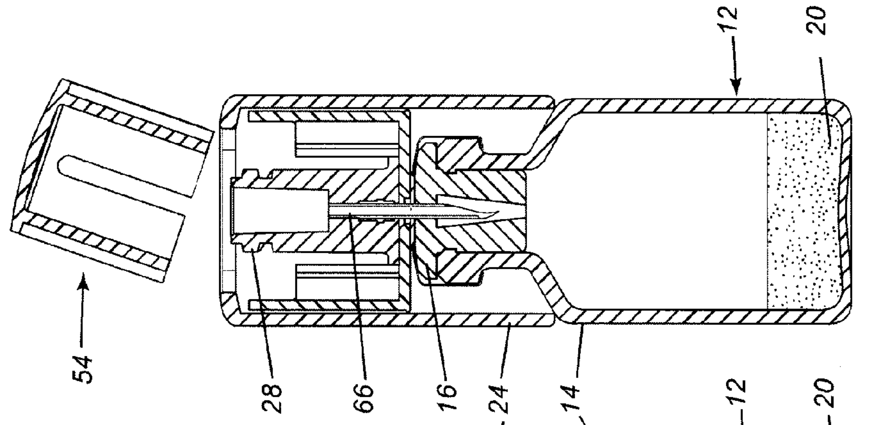
FIG. 13 is a cross sectional view similar to FIGS. 11 and 12 illustrating removal of the cap.
Figure 12:
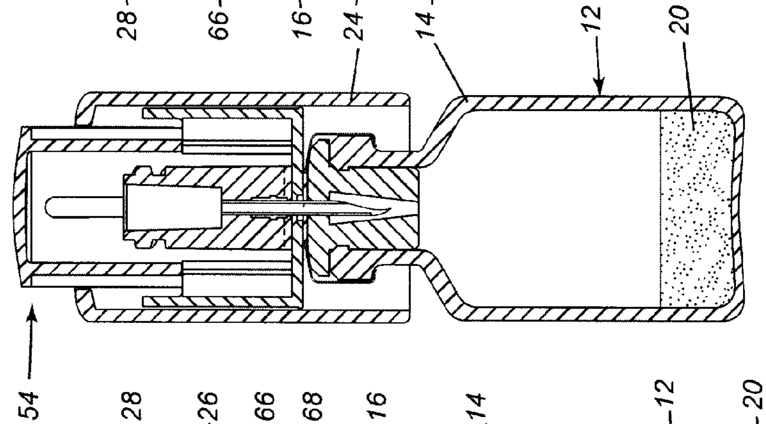
FIG. 12 is a cross sectional view similar to FIG. 11 illustrating the piercing of the septum of the vial and commencement of the removal of the cap.
Figure 11:
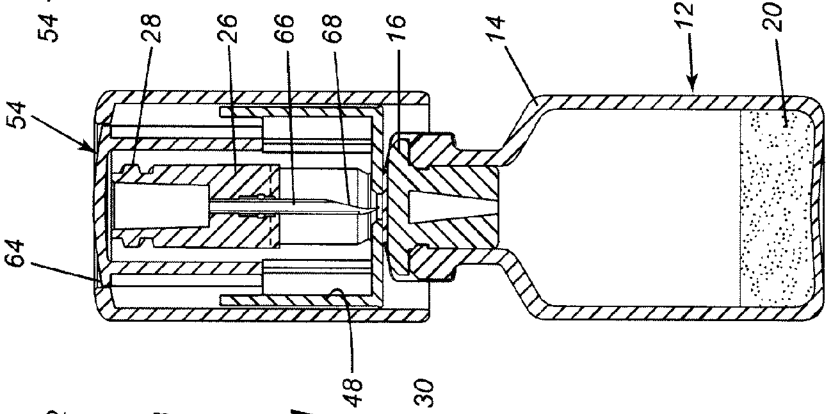
FIG. 11 is a cross sectional view illustrating placement of the transfer device on the top of a vial, this view being rotated 90° from the view of FIG. 5B.
Figure 10:
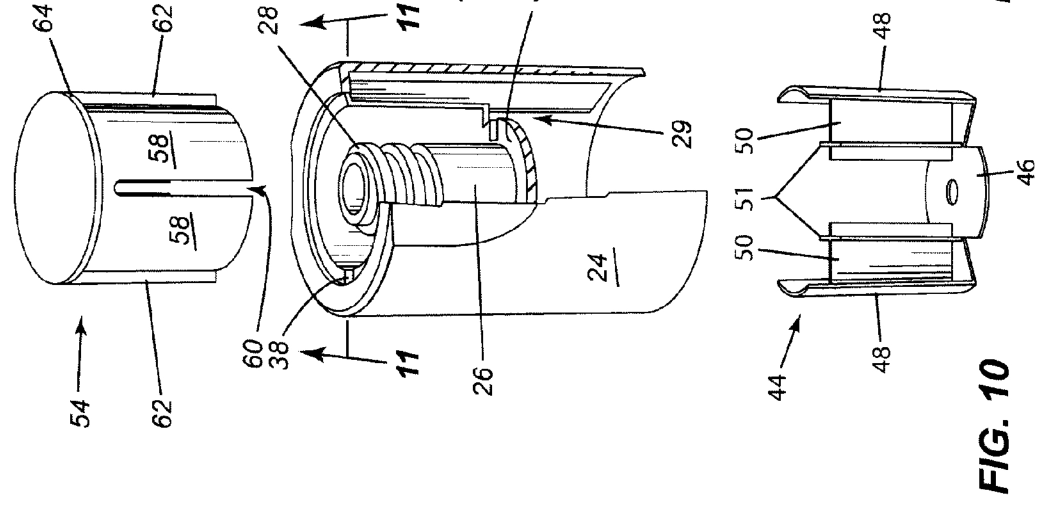
FIG. 10 is an exploded view, partially in cutaway, of the components of the transfer device.

In operation, transfer system 10 is placed on top of vial 12 as shown in FIGS. 5A and 11 with a finger or thumb engaging depression 25. Transfer system 10 is then moved downwardly as shown in FIGS. 6B, 12 and 13. In moving upwardly, the lower tapered ends 34 of legs 32 engage the cap 18 of vial 12 and force the legs outwardly. This allows release of base 46 of pusher element 44. Continued movement will cause latches 36 to engage the neck of vial 12. This upward movement causes a piercing of septum 16 by piercing tip 68 of needle 66 to thereby reduce any vacuum therein. The upward movement also results in elements 50 of pusher member 44 moving upwardly to engage the bottom edge of side walls 58 of cover 54 to move the same upwardly. This then permits the removal of cover 54 and access to the contents 20 of vial 12.

Figure 3:
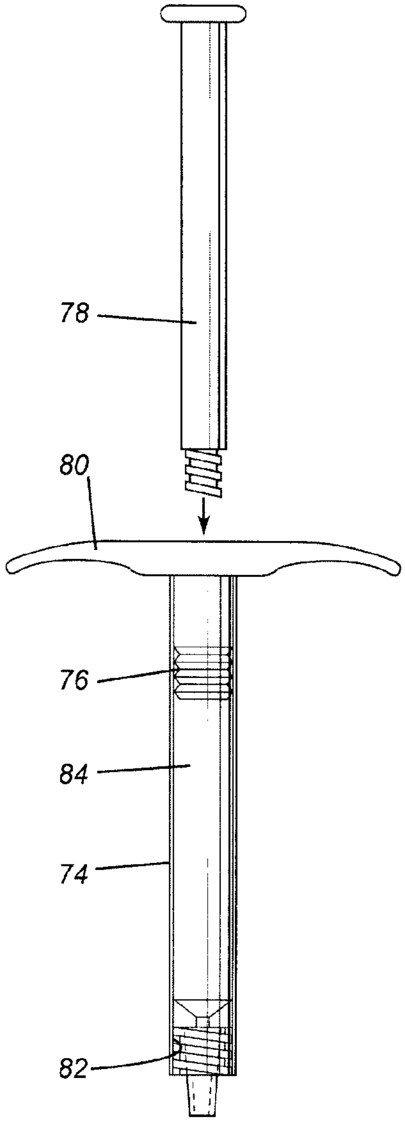
FIG. 3 is a side elevational view of a syringe and plunger rod.
Figure 4:
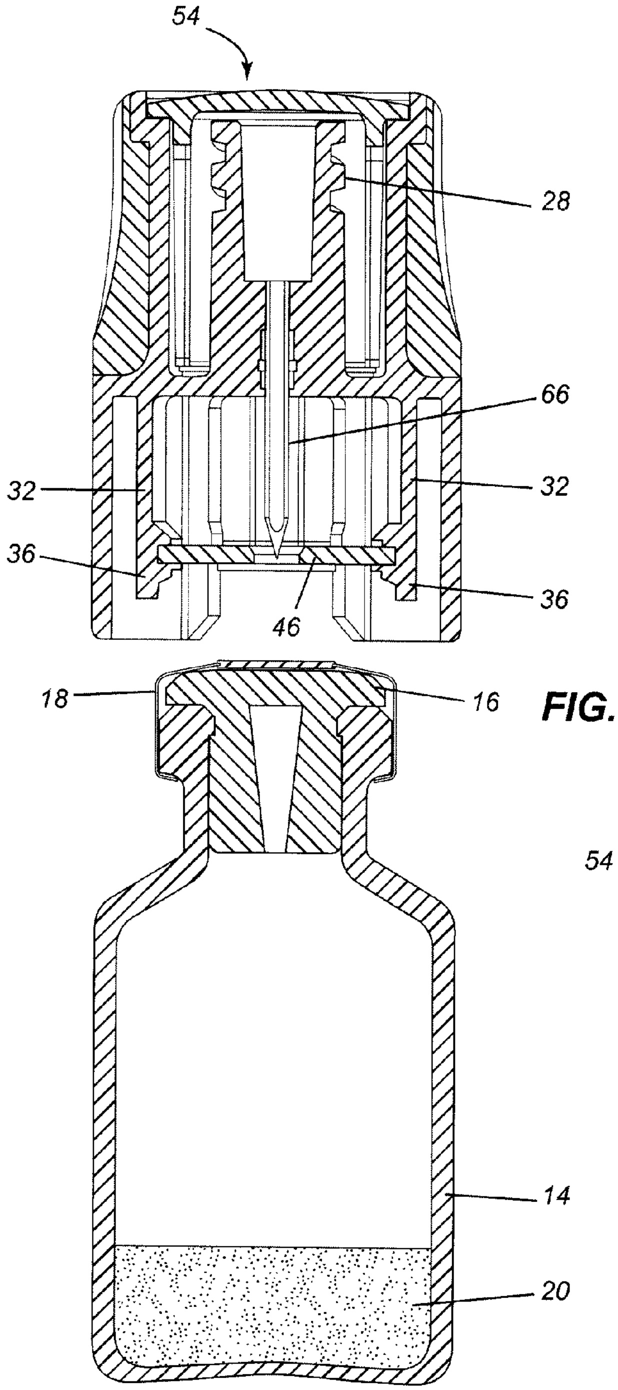
FIG. 4 is a cross sectional view of the transfer device prior to its use.

The transfer system is preferably utilized with a syringe such as shown in FIGS. 3 and 4. The syringe includes a syringe body 74 having a plunger 76 mounted therein. A plunger rod 78 is designed to be screwthreadedly engageable with plunger 76. Preferably, syringe body 74 includes a back stop 80 to permit proper gripping by the hand of the user. At its front end, syringe body 74 includes a female luer connection 82. Typically, syringe body 74 is filled with a diluent 84 (FIG. 7) although any desired fluid may be utilized.

Figure 7:
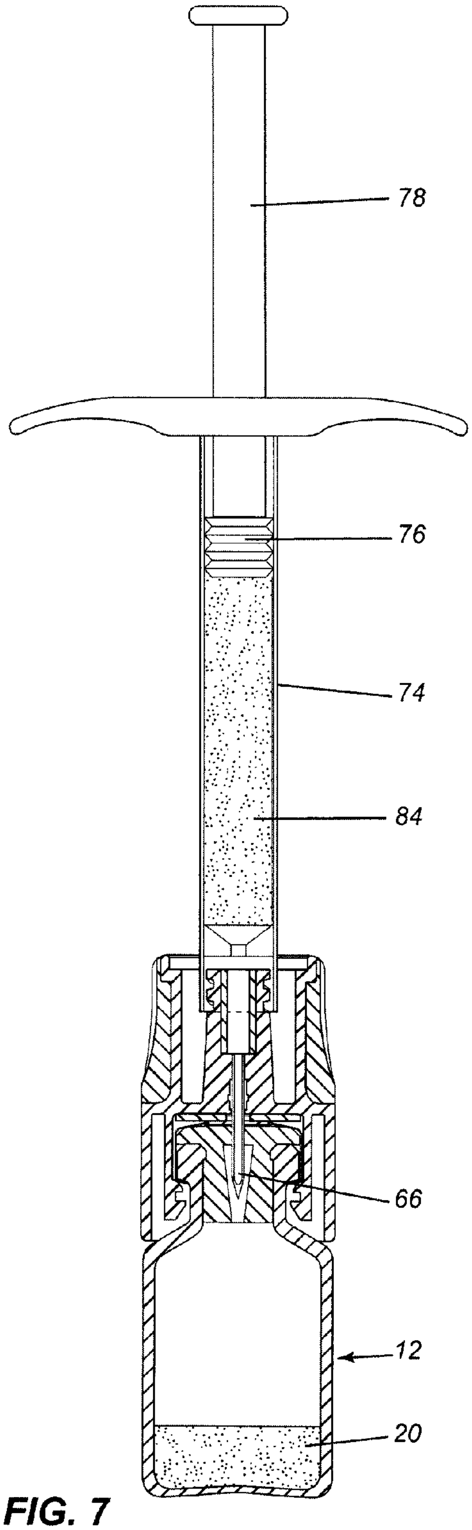
FIG. 7 is a view, partially in cross section, of a syringe being attached to the transfer device.
Figure 8:
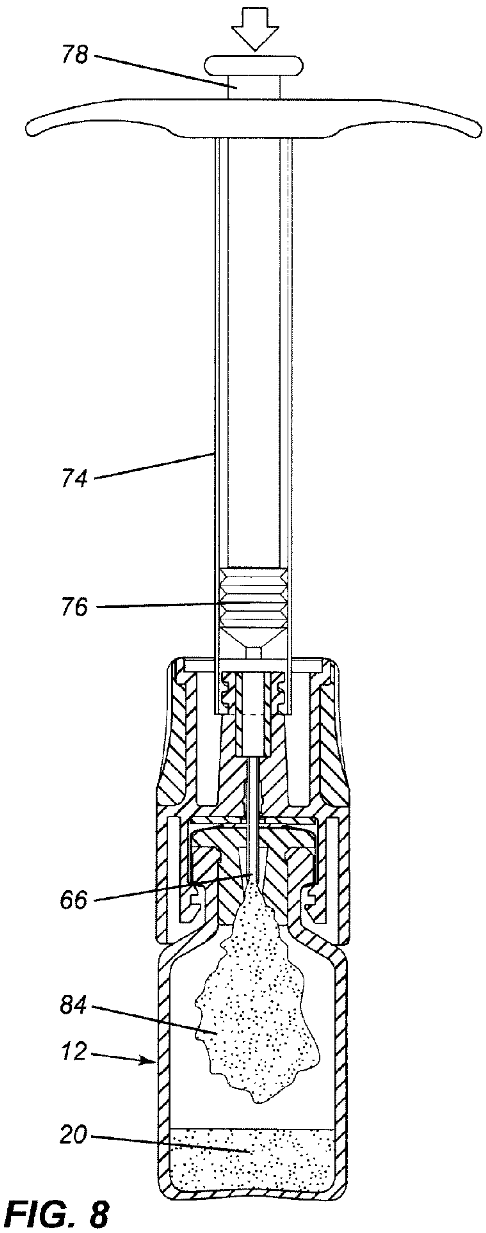
FIG. 8 is a view similar to FIG. 7A illustrating the mixing of components.
Figure 9:
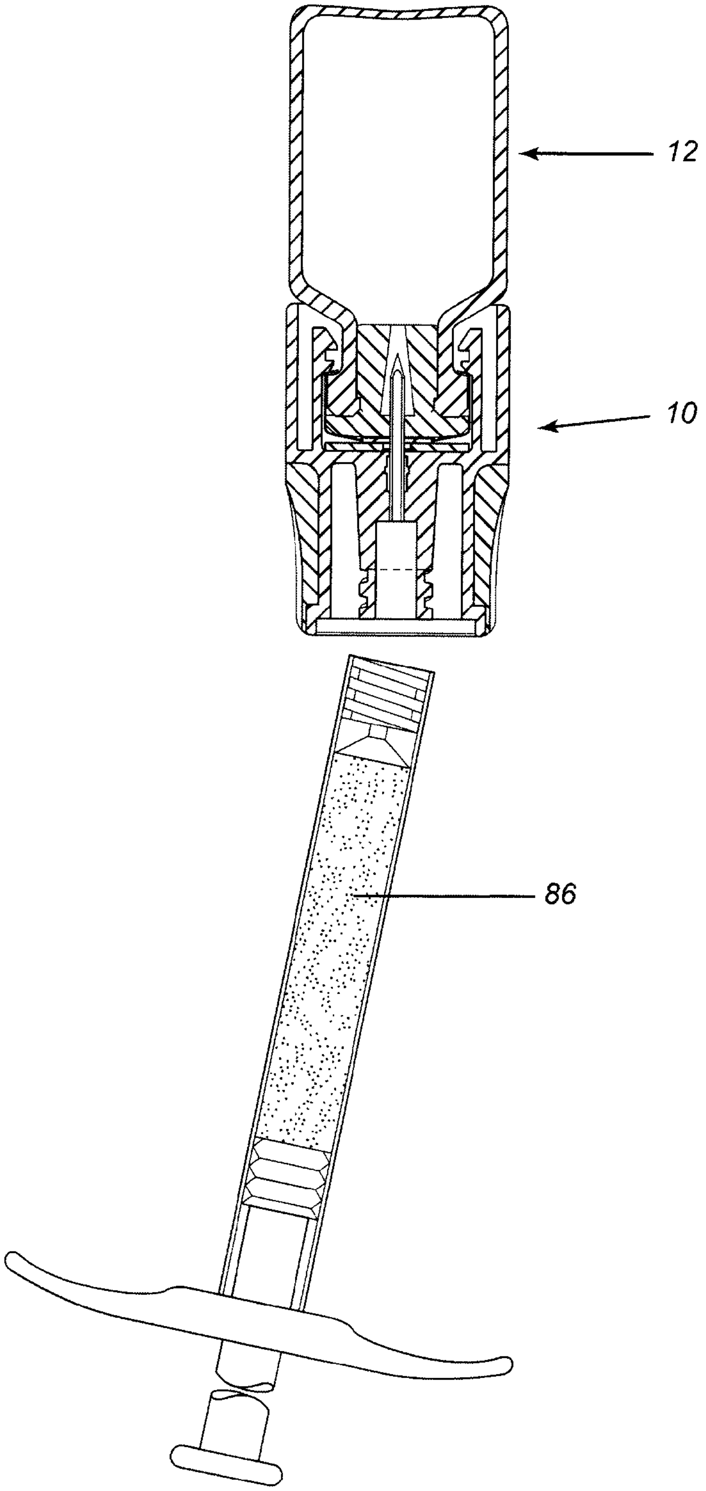
FIG. 9 is a view, partially in section, illustrating the aspiration of the mixture into the syringe.

As shown in FIG. 7, plunger rod 78 is connected to plunger 76 and the diluent 84 is then forced into vial body 14 as shown in FIG. 8. The diluent and medicant 20 may then be mixed. The vial/diluent may then be mixed and the assembly inverted as shown in FIG. 9. The mixture 86 is then aspirated back into syringe body 74. The mixture 86 is then ready for injection when a needle assembly is attached to luer connection 82.

Figure 14:
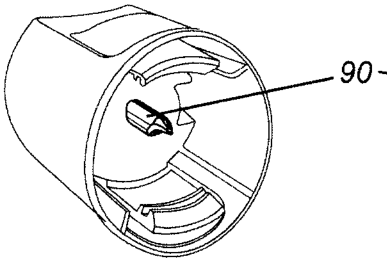
FIG. 14 illustrates a further embodiment wherein the piercing member is a spike.
Figure 15:
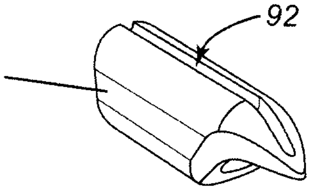
FIG. 15 illustrates a variation thereof wherein the spike has a vent formed therein.
Figure 16:
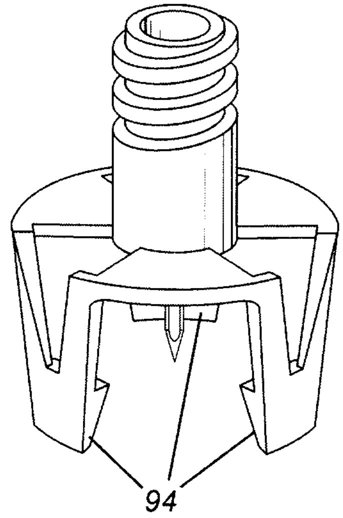
FIG. 16 illustrates a modified inner body member.
Figure 17:
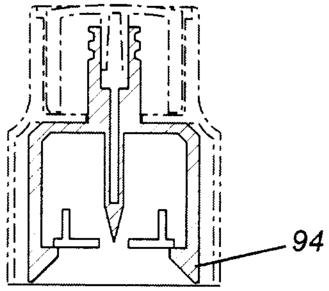
FIG. 17 is a cross sectional view thereof.

As shown in FIGS. 14 and 15, the device may include a spike 90 to replace the needle 66. Spike 90 may include a venting channel 92 formed therein to permit pressure equalization upon piercing of the vial. As shown in FIGS. 16 and 17, various numbers of legs may be employed; in FIG. 16 three legs 94 are illustrated.

We claim:

1. A transfer device comprising:

an outer housing (24);

a wall (30) extending across an interior of said outer housing to thereby form an upper chamber and a lower chamber, said wall having at least one opening (29) therein;

an inner body (26) formed in said upper chamber, a conduit (66) extending through said inner body to provide fluid communication between said upper and lower chambers, said conduit having a piercing tip (68) at a lower end thereof;

a cap (54), said cap having a top wall (56)and a downwardly extending side wall (58), said top wall (56) extending across said upper chamber, said side wall (58) extending downwardly between said outer housing (24) and said inner body(26); and a pushing member (44) having a bottom wall (46) and at least one leg (48) extending upwardly therefrom, said pushing member (44) having an unactivated position wherein said pushing member is located in said lower chamber, and an activated position wherein said at least one leg (48) extends through said at least one opening in said wall (29) extending across the interior of said outer housing, the arrangement being such that when a vial (12) is inserted in said lower chamber, said pushing member (44) is moved from an unactivated position to an activated position such that said at least one leg (48) will push on said side wall (58) of said cap (54) to raise said top wall of said cap above said outer housing (24).

2. The transfer device of claim 1 further including a plurality of latches (36) extending downwardly within said lower chamber, said latches being designed to engage a neck of a vial (12) inserted in said lower chamber.

3. The transfer device of claim 2 wherein said latches (36) each have a recess (37) located on an inner face thereof, said recesses (37) retaining said pushing member (44) when in an inactivated position.

4. The transfer device of claim 3 wherein said top wall (56) of said cap(54) sits within a recess formed in said upper housing to provide a continuous surface therewith to inhibit removal thereof.

5. The transfer device of claim 4 wherein said side wall (58) has a plurality of slots therein to thereby form a plurality of wall segments (58).

6. The transfer device of claim 5 wherein at least one of said wall segments (58) is biased outwardly such that frictional contact is made with said outer housing (24) to thereby inhibit removal of said cap.

7. The transfer device of claim 1 wherein said inner body has a male luer connection (28) formed at a free end thereof.

8. The transfer device of claim 7 wherein said inner body has a cavity formed within, said conduit (66) being in fluid communication with said cavity.

9. The transfer device of claim 1 wherein said pushing member (44) has a plurality of legs (48) extending upwardly therefrom, each leg (48) being associated with an opening (29) in said wall extending across an interior of said outer housing.

10. The transfer device of claim 1 further including a pair of thumb rests (25) formed on the exterior surface of said outer housing (24) to facilitate movement of said housing downwardly on a vial.

11. A method for mixing and using two pharmaceutical constituents, one being in a vial, a second being in a syringe, comprising the steps of:

providing the transfer device of claim 1;

inserting said vial into said lower chamber to thereby pierce a septum of said vial and thereby to equalize pressure within and outside said vial, said vial acting on said pushing member to lift said cap;

removing said cap, attaching said syringe to said inner body, advancing a plunger of said syringe to transfer fluid from said syringe to said vial;

mixing said two pharmaceutical constituents within said vial; and pulling back said plunger to aspirate the mixture in said vial to said syringe.

12. The method of claim 11 further including the step of attaching a needle to said syringe.

* * * * *